ABSTRACT OF THE DISCLOSURE

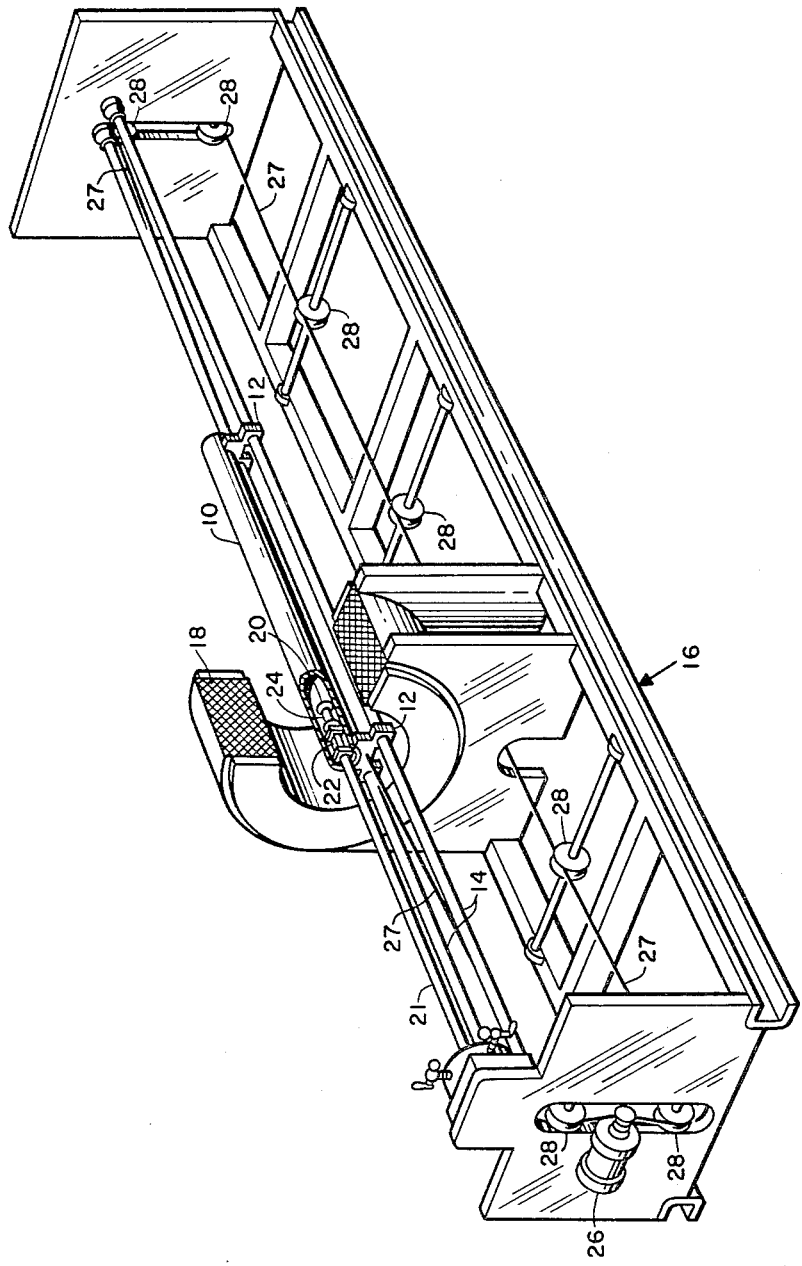
FELIX N. KUSENBERGER
HERMAN F. BARSUN
JOSEPH W. FOGWELL
INVENTORS
BY *J. M. St. Amand*
ATTORNEY 3,379,970
MAGNETIC CRACK DETECTOR FOR
FERROMAGNETIC TUBING
Felix N. Kusenberger, Herman F. Barsun, and Joseph W. Fogwell, San Antonio, Tex., assignors, by mesne assignments, to the United States of America as represented by the Secretary of the Navy
Filed May 10, 1965, Ser. No. 454,756
1 Claim. (Cl. 324—37)

A magnetic device for nondestructive inspection of metal tubing to detect fatigue cracks, voids, and defects by moving tubing over a stationary magnetic coil that is vibrated by an ultrasonic transducer.

The present invention relates to fatigue detection equipment and more particularly to a magnetic crack detector for articles manufactured from ferromagnetic materials.

There are several theories at the present time concerning the mechanism of fatigue. In nearly all cases, the early phases of fatigue development are explained in terms of dislocation movement and pile-up. It has been postulated that such dislocation pile-up causes localized residual stresses and the formation of microcracks prior to the initiation and propagation of a macrocrack. It is therefore apparent that the nondestructive detection of fatigue damage prior to the macrocracking phase requires an inspection technique capable of resolving localized residual stresses and perhaps microcracking. The device of the instant invention utilizes certain magnetic techniques for detecting these aforementioned conditions.

A considerable amount of work was expended in developing and exploring magnetic techniques prior to the development of the instant fatigue detection equipment. The techniques incorporated in the equipment to be discussed essentially consist of the detection of perturbations in an applied magnetic field at the surface of a ferromagnetic part under inspection. The part to be inspected is magnetized such that the flux lines are parallel to the metal surface at the point of inspection. Any material inhomogeneities produce perturbations in the magnetic field which are detected using a flux sensitive transducer. There are several suitable types of transducers for measurement of the perturbations in the magnetic field and the one used for the tubing inspection device is briefly discussed in the description. Certain experimental results obtained are of particular interest for the fatigue detection problem. These results have shown that the magnitude of the applied field is useful in distinguishing between nonferromagnetic signal sources and localized stresses.

In general, defects such as voids or a void type source (inclusions, cracks, etc.) can be readily detected using relatively high applied magnetic fields while localized residual stresses are more readily detectable with low applied magnetic fields. Furthermore, the signals from a localized stress are essentially erased at high magnetic fields. The effects of magnetic field level on perturbations from localized stresses can be explained by the domain theory and magnetostrictive effects.

It is an object of the invention to provide a new and improved fatigue detector for ferromagnetic materials.

Another object of the invention is to provide a magnetic crack detector for ferromagnetic material tubing.

A further object of the invention is to provide a defect detection system for metal tubing wherein the tubing is moved over a stationary coil that is vibrated by an ultrasonic transducer.

Other objects and many of the attendant advantages of this invention will become readily appreciated as the same becomes better understood by reference to the following detailed description when considered in connection with the accompanying drawing wherein:

The figure of drawing shows a functional sketch of a tubing inspection device of the present invention.

In the embodiment of the invention illustrated in the drawing, the tubular specimen 10 to be inspected is supported on carriages 12 which ride on a pair of guide bars 14 in a manner such that the tube 10 can be moved parallel to its longitudinal axis along the guide bars. As can be seen from the drawing tubular specimen 10 is freely supported on carriages 12 in a manner permitting it to be turned, manually for example, about its longitudinal axis. These two degrees of freedom permit the entire surface of the tubular specimen 10 to be inspected by successively scanning narrow longitudinal segments of the specimen. The entire assembly is mounted on a frame 16.

The specimen 10 is magnetized with the lines of flux parallel to the longitudinal axis using a solenoid type magnetizing coil 18. Thus each part of the specimen is magnetized as it passes through the magnetizing coil 18.

A transducer 20 for detecting perturbations in the magnetic field is fixed in position relative to magnetizing coil 18. Transducer 20 is supported on the end of a long bar 21 thereby permitting the tubular specimen 10 to be inspected through the bore. The flux sensing transducer 20 consists of a small coil of wire which is vibrated by an attached ultrasonic transducer 22. The vibratory motion provides the necessary relative velocity between the wire coil of transducer 20 and the perturbed magnetic field from magnetizing coil 18 to be measured such that an electromotive force is induced in the wire of transducer coil 20 which is proportional to the relative velocity and the strength of the magnetic field.

The output of transducer sensing coil 20 is then amplified by a small solid state amplifier 24 which is mounted immediately adjacent to the sensing coil. The amplifier signals are then phase and amplitude demodulated to provide polarity as well as amplitude information. The output from the demodulator (not shown) can then be displayed on an oscilloscope or recorded for further study.

The magnetizing coil 18, probe assembly 20–22 and associated circuitry were tested by stress cycling tubular steel specimen and periodic magnetic inspections. Signals were obtained by the instant device prior to the initiation of any macrocrack and a smooth increase in signal amplitude was obtained with further stress cycling of each specimen.

A longitudinal drive system, including a variable speed electric motor 26, cable 27 attached to carriages 12 and a number of grooved cable guide wheels 28, provides an adjustable rate of longitudinal motion of specimen 10. The longitudinal drive system can be operated either manually or automatically.

Adjustable limit switches can also be provided for accommodating a range of specimen lengths. The specimen can be manually or automatically indexed in rotation. Selection of automatic indexing can be at one end or both ends of longitudinal travel. The indexing angle can be adjustable to accommodate a range of specimen diameters.

In the instant device, the magnetic field is produced by a solenoid type magnetizing coil which is not in physical contact with the specimen. This feature permits a range of specimen sizes to be inspected with the same magnetizing coil. The strength of the applied field of the magnetizing coil is continuously adjustable from zero to maximum.

Within the scope of the invention the device can be constructed so that the probe head is located external to the specimen so that the specimen can be inspected on its outer surface. With this arrangement it would be possible to inspect solid round bars. Also, the configuration of the device can be arranged in reverse where the specimen is held stationary, with respect to the frame, and the magnetizing coil and probe moved along the length of the specimen.

Obviously many modifications and variations of the present invention are possible in the light of the above teachings. It is therefore to be understood that within the scope of the appended claim the invention may be practiced otherwise than as specifically described.

What is claimed is:

1. A nondestructive device for the detection of fatigue damage in ferromagnetic material, comprising:
   (a) an assembly support frame,
   (b) guide rails mounted along the length of said frame,
   (c) carriage means mounted upon said guide rails and operable to be moved therealong,
   (d) said carriage means adaptable to having a hollow open-end specimen which is to be tested carried thereon; means providing the specimen carried on said carriage means with two degrees of freedom, one for movement parallel to its longitudinal axis by movement of the carriage means along said rails and the other permitting rotational movement by rotating the specimen about its longitudinal axis allowing inspection of the entire surface of a specimen by successively scanning narrow longitudinal segments of the specimen,
   (e) a solenoid type fixed electromagnetic coil whose applied field is continuously adjustable from zero to maximum,
   (f) said guide rails passing through said fixed magnetizing coil such that a specimen carried on said carriage means can be moved along the guide rails and completely pass through the coil without physical contact therewith,
   (g) a probe head,
   (h) a probe support bar mounted parallel to said guide rails for supporting said probe head in a fixed position at the center of said magnetizing coil and operable to permit said specimen to surround said probe head without contact as the specimen passes through the magnetizing coil wherein the specimen being tested is magnetized with the lines of flux parallel to its longitudinal axis,
   (i) said probe head consisting of a flux sensitive transducer means comprising a small sensing coil of wire vibrated by an attached ultrasonic transducer for detecting any perturbations in the magnetic field produced by said magnetizing coil due to inhomogeneities in the ferromagnetic material of the specimen as the specimen passes through the magnetizing coil, the vibratory motion of the sensing coil providing the necessary relative velocity between the sensing coil wire and the magnetic field to be measured such that an electromotive force is induced in the wire which is proportional to the relative velocity and the strength of the magnetic field.

References Cited
UNITED STATES PATENTS

| | | | |
|---|---|---|---|
| 2,542,893 | 2/1951 | Bender et al. | 324—34.1 |
| 2,684,464 | 7/1954 | Hastings et al. | 324—34.11 |
| 3,015,063 | 12/1961 | Ownby | 324—37 |
| 3,209,243 | 9/1965 | Walters et al. | 324—37 |

RUDOLPH V. ROLINEC, *Primary Examiner.*

R. J. CORCORAN, *Assistant Examiner.*